(12) United States Patent
Akan et al.

(10) Patent No.: US 10,279,478 B2
(45) Date of Patent: May 7, 2019

(54) SYSTEM AND A METHOD FOR PROGRAMMING AN INDUSTRIAL ROBOT

(71) Applicant: OpiFlex Automation AB, Västerås (SE)

(72) Inventors: Batu Akan, Västerås (SE); Johan Frisk, Täby (SE)

(73) Assignee: OpiFlex Automation AB, Västerås (SE)

( * ) Notice: Subject to any disclaimer, the term of this patent is extended or adjusted under 35 U.S.C. 154(b) by 238 days.

(21) Appl. No.: 15/585,206

(22) Filed: May 3, 2017

(65) Prior Publication Data

US 2017/0320211 A1    Nov. 9, 2017

(30) Foreign Application Priority Data

May 9, 2016   (EP) .................................... 16168794

(51) Int. Cl.
*G01C 21/00*      (2006.01)
*B25J 9/16*       (2006.01)
(Continued)

(52) U.S. Cl.
CPC ........... *B25J 9/1671* (2013.01); *B25J 9/1656* (2013.01); *B25J 9/1661* (2013.01); *B25J 9/1666* (2013.01);
(Continued)

(58) Field of Classification Search
CPC ...... B25J 9/1671; B25J 9/1666; B25J 9/1661; B25J 9/1656; B25J 9/00; G06F 8/34;
(Continued)

(56) References Cited

U.S. PATENT DOCUMENTS 7,643,907 B2    1/2010 Fuhlbrigge et al.
2006/0178778 A1    8/2006 Fuhlbrigge et al.
(Continued)

FOREIGN PATENT DOCUMENTS

EP    0531435 B1    8/1996
EP    1724676 A1    11/2006
(Continued)

OTHER PUBLICATIONS

R. King, "Mobile Robotics Experiments with DaNI", Colorado School of Mines.

*Primary Examiner* — Ian Jen
(74) *Attorney, Agent, or Firm* — Seppo Laine Oy

(57) ABSTRACT

The present invention relates to a system and a method for programming an industrial robot (3) to perform work in a robot cell including a plurality of workstations (4a-c). The method comprises:
   a first memory location for storing a plurality of programming blocks including robot code comprising program instructions for the robot to carrying out a part of a task, and at least some of the programming blocks comprises program code including program instructions for generating a graphical user interface for guiding a user to program the part of the task,
   a graphical generator configured to generate a first wizard including a first graphical user interface allowing a user to define a plurality of workstations, to select a sequence of said programming blocks for each of the defined workstations, and to define a specific robot cell including one or more of said defined workstations, and
   a programming tool generator configured to generate a guiding tool for programming the specific robot cell based on the program code of the selected sequences of programming blocks for the workstations in the robot cell, wherein the guiding tool comprises program code
(Continued)

for generating a second wizard having a second graphical user interface comprising a sequence of views including instructions for guiding a user to program the specific robot cell, and allowing the user to select one or more of the workstations in the specific robot cell, and to input parameters in response to the displayed instructions.

16 Claims, 8 Drawing Sheets

(51) Int. Cl.
*G05B 19/425* (2006.01)
*G06F 3/048* (2013.01)
*G06F 8/34* (2018.01)
*B25J 9/00* (2006.01)
*G06F 3/01* (2006.01)

(52) U.S. Cl.
CPC ........... *G05B 19/425* (2013.01); *G06F 3/048* (2013.01); *G06F 8/34* (2013.01); *B25J 9/00* (2013.01); *G05B 2219/00* (2013.01); *G05B 2219/40099* (2013.01); *G05B 2219/40392* (2013.01); *G05B 2219/40479* (2013.01); *G06F 3/01* (2013.01)

(58) Field of Classification Search
CPC ......... G06F 3/048; G06F 3/01; G05B 19/425; G05B 2219/40099; G05B 2219/40479; G05B 2219/00; G05B 2219/40392
See application file for complete search history.

(56) References Cited

U.S. PATENT DOCUMENTS

| | | | |
|---|---|---|---|
| 2007/0150102 A1 | 6/2007 | Park et al. | |
| 2010/0262288 A1* | 10/2010 | Svensson | B25J 9/1671 700/254 |
| 2013/0086022 A1* | 4/2013 | Black, III | G11B 27/36 707/705 |
| 2014/0298231 A1 | 10/2014 | Saito et al. | |
| 2017/0320211 A1* | 11/2017 | Akan | G06F 3/048 |

FOREIGN PATENT DOCUMENTS

| | | |
|---|---|---|
| EP | 1842631 A1 | 10/2007 |
| EP | 2129498 B1 | 3/2011 |
| EP | 1815301 B1 | 7/2015 |
| WO | WO 0169332 A2 | 9/2001 |
| WO | WO 2006043873 A1 | 4/2006 |
| WO | WO 2007113112 A1 | 10/2007 |
| WO | WO 2010045968 A1 | 4/2010 |

\* cited by examiner

SYSTEM AND A METHOD FOR PROGRAMMING AN INDUSTRIAL ROBOT

FIELD OF THE INVENTION

The present invention relates to a system and a method for programming an industrial robot to perform work in a robot cell including a plurality of workstations.

BACKGROUND OF THE INVENTION

In many factories the manufacture takes place at different workstations. Robots performing tasks at the workstations can be used in order to increase the productivity. The robot can perform operations, such as welding, gluing, painting, grinding, picking, and assembly at the workstations.

Robots are usually placed in robot cells in order to facilitate the automation of complex series of actions. The robot cell may comprise a number of different workstations and the robot can be programmed to perform different tasks at the different workstations. A workstation may, for example, contain a machine, such as an injection molding machine, a die casting machine, a sheet metal machine and a CNC machine. Other examples of workstations are scrap stations for throwing away rejected objects, devices for vision control of objects, stations for subsequent treatment of the objects, and input and output stations such as conveyors, input pallets or output pallets.

Before an industrial robot is put into operation for a certain task, it must be programmed to carry out the task. The robot programmer must, for example, program the order in which the robot shall visit the workstations, program how the I/O signals are to be used to interact with the workstations, how the tool is to be operated at the station, and program all of the robot paths to be used. Programming of a robot cell can be very complex. Traditional robot programming requires the significant robot knowledge in general and knowledge of the specific robot manufacturers' robot code as well. When programming an industrial robot, a robot language is used. Typical robot programming languages include instructions for robot motion, handling input and output signals, program comments, and handling program flow. Each industrial robot manufacturer has its own robot programming language. The robot program comprises a series of instructions written in a robot programming languages where each instruction tells the robot controller what to do and how to do it. The use of a programming language offers the advantage of great flexibility, but also requires that the person, who is programming the robot, has knowledge about robot programming and, in particular, about robot languages of different robots. However, in the industry it is not always possible to have operators with knowledge about robot programming. Thus, there is a desire to make it possible for operators without any knowledge about programming language to program the robot in a simple and intuitive way.

Today there exist some robot programming wizards, which lead the operators through the questions and allows a user to give input give input in terms of parameters and teaching paths in response to the questions. Wizards are based on static programs where the wizards is a user interface layer on top of the robot program. This means that each wizard is custom-built for the application, e.g. for palletizing or press brakes.

WO/2006/043873 discloses a system and a method for programming an industrial robot to perform a work cycle including visiting and performing work on a plurality of workstations. A set of predefined workstations comprising preprogrammed robot code for controlling the robot so that it carries out a defined task at the workstation, and a wizard providing a graphical interface for guiding the user during the programming of the workstation is created in advance. The preprogrammed robot code comprises predefined movement paths for the robot for carrying out the task at the workstation. The movement path, which the robot shall follow during the task, is defined by a sequence of waypoints, in the following denoted targets. During programming of the robot, the wizard displays information about the predefined workstations, and allows a user to select one or more of the predefined workstations and to specify the order in which the robot shall visit the selected workstations. The wizard makes it possible for the programmer configure the settings of the workstation and to change the positions of the targets of the predefined movement path. The programming code is hidden from the user, and the user creates a robot program by interacting with the graphical interface of the wizard. A robot program generator generates a robot program for performing the work cycle based on the predefined workstations and the user inputs. The method and system described in WO/2006/043873 makes it possible for a user to create a robot program for a robot cell without using any programming code. However, the workstations has to be defined in advance and robot code for each of the workstations has be created in advance, which is time consuming. It also takes time and effort to create the wizard. Further, if any of the workstations has to be amended, or a new workstation is to be added, it time consuming to adjust the wizard. Another problem is that different customer has different sets of workstations. Thus, it is a desire to customize the wizard to a customer or a robot cell.

EP2 129 498B1 discloses a method and an apparatus for programming an industrial robot working in a robot cell including one or more workstations. The apparatus comprises a memory location for storing preprogrammed robot code comprising program instructions where accommodations for optional parameters are made, and for storing at least one predefined workstation having a plurality of different scenarios, each scenario including a set of parameters defining how the robot will perform work on the workstation, a graphical display and input device adapted to present a graphical user interface displaying a graphical object representing the workstation, displaying information about the scenarios together with the graphical object representing the workstation, and allowing the user to select one of the scenarios associated with the workstation, and a robot program generator adapted to generate a robot program based on user selected scenarios and the preprogrammed robot code. Each scenario contains a sequence of one or more default actions having default parameters related to how the action is to be carried out. This makes it possible to beforehand define and create program code for a plurality of possible scenarios for the workstations and allows a programmer to select among the predefined scenarios. The scenarios are displayed together with a graphical object representing the workstation, thereby facilitating the programming for the operator. A disadvantage with this method is that the selectable scenarios are given beforehand, and accordingly the flexibility of the programming of the workstations is reduced.

Thus, designing a tool for guiding through programming of an industrial robot is a tradeoff between flexibility and simplicity of the programming.

In small and medium-sized enterprise, a system designer with a certain knowledge of robot programming is used to set up and program the robot in the robot cell. However, when a new product is to be produced, or there are other minor changes to the production, the system designer has to come back and reprogram the robot. This can be costly, in particular, if small batches are produced. It is desired that an end user, without any knowledge of robot programming, can reprogram the robot in a simple way.

OBJECT AND SUMMARY OF THE INVENTION

It is an object of the present invention to at least partly overcome the above mentioned problems, and to provide a programming tool that provides flexibility as well as simplicity for the user.

According to a first aspect of the invention, this object is achieved by a programming system as defined in claim 1.

The system comprises a first memory location for storing a plurality of programming blocks, wherein each of the programming blocks includes robot code comprising program instructions for the robot to carrying out a part of a task, and at least some of the programming blocks comprises program code including program instructions for generating a graphical user interface for guiding a user to program the part of the task, a graphical generator configured to generate a first wizard including a first graphical user interface allowing a user to define a plurality of workstations, to select a sequence of said programming blocks for each of the defined workstations, and to define a specific robot cell including one or more of said defined workstations, and a programming tool generator configured to generate a guiding tool for programming said specific robot cell based on the program code in the selected sequences of programming blocks for the workstations in the specific robot cell, wherein the guiding tool comprises program code for generating a second wizard having a second graphical user interface comprising a sequence of views including instructions for guiding a user to program the specific robot cell and allowing the user to select one or more of the workstations in the specific robot cell, and to input parameters in response to the displayed instructions.

The system according to the invention makes it possible to carry out the programming into two parts. In the first part of the programming, the user sets up the robot cell, including the workstations inside the robot cell. The first part requires special knowledge about how to program a task at a workstation. This part must be carried out by a system integrator. The first part can be carried out at any computer unit, and at remote location. In the second part, the user defines details regarding task the robot shall carry out at each of the workstations. This part does not require any special knowledge about programming of the workstations. The second part can be carried out at the robot cell, for example, using a portable programming unit connected to the robot.

The first wizard includes a first graphical user interface comprising a sequence of views with instructions for guiding a first user to define workstations in a specific robot cell. The second wizard includes a second graphical user interface comprising a sequence of views with instructions for guiding a second user to program the specific robot cell. The first user can be a system integrator and the second user can be a robot operator.

In the first part of the programming, the user sets up a specific robot cell by defining the workstations needed in the robot cell. The robot cell including the defined workstations corresponds to a real robot cell at site including real workstations. According to the invention, a plurality of programming blocks for carrying out a part of a task are provided. Each of the programming blocks comprises preprogrammed robot code for carrying out a part of a task. The sequence of the blocks defines the logic of the workstation and the robot in cooperation with each other. A least some of the programming blocks also include program code for generating a graphical user interface for guiding a user to program the part of the task. For example, the graphical user interface enables a user to input or adjust parameters needed for carrying out the part of the task. All of the programming blocks may include program code for generating a graphical user interface for guiding a user to program the part of the task. The first wizard guides the user to define the workstations needed in the specific robot cell by enabling the user to select a sequence of programming blocks for each of the defined work stations. The system enables a user to define a workstation and to determine a task to be carried out by the robot at the workstation by selecting a sequence of programming blocks for the defined workstation. The selected sequence of programming blocks determines the order of execution of the parts of the task so that they together carry out the desired task at the workstation. Thus, the system enables the user to define a specific robot cell including one or more of said defined workstations. By executing the robot code in the selected programming blocks in accordance with the determined sequence, the robot will perform the determined task.

With robot code is meant code which can be executed by a robot or robot controller. With program code is meant code which can be executed on any type of computer.

However, the robot code is not complete, there are parameters that need values. For example, positions on movement paths for the robot at the workstations need to be programmed on site. According to the invention, a guiding tool for guiding a user to input the parameters needed for the workstations in the robot cell is automatically generated based on the program code in the selected sequences of programming blocks. The sequence of views generated when the guiding tool is executed, constitutes a second wizard for guiding the user to input the parameters needed for completing the programming of the robot in the robot cell. The guiding tool depends on the selected programming blocks and the selected order of the programming blocks. Thus, the guiding tool is adapted to the specific robot cell. If the system integrator changes the order of the programming block or selects other programming blocks, the program code of the guiding tool will differ, and thus the second wizard will include a different sequence of views and include different instructions for guiding the user to program the robot cell. The second wizard is simple and self-instructing. The second wizard generated by the guiding tool helps the user to input the parameters needed for completing the programming of the robot. The guiding tool is executed on a local computer close to the robot in the robot cell. The second part is preferably carried out by the robot operator at site.

The operator's job is just to define the details of the task to be carried out by the robot at each of the workstation. This is done by following the second wizard generated by the guiding tool, e.g. how to pick up an object from an input palette, and fine adjustments of how to insert an object into a machine. This gives the operator the freedom to specify paths and points at each station for different types of parts to create different types of products.

The second wizard acts as a guide for the operator by explaining all the steps in the process of creating a program for a product. The operator only needs to know what sequence of workstations is needed to create the product. By following the instructions in the second wizard, the operator teaches the robot by moving the robot and saving points, or by moving a physical part around during the teaching, which at the end of teaching will become the final product.

When the operator has gone through all the views in the guiding tool, the robot program generator generates a robot program based on the robot code of the selected sequences of programming blocks for the selected workstations and the received parameters. Suitably, robot code includes accommodations for optional parameters. The robot program generator then fills in the values for the parameters in the accommodations in the robot code during the generation of the robot program.

The system according to the invention makes it possible for the integrator to design a guiding tool for guiding the operator at site how to adapt the robot program to a certain application in the specific robot cell. The guiding tool is adapted to the specific robot cell and can be reused when there is a need to reprogram the specific robot cell, for example, when a new type of product is to be produced. As long as the workstations are the same in the robot cell, the same guiding tool can be used. By using the guiding tool, reprogramming of the robot cell is simple and can be done very quickly by the operator. Typically, reprogramming will take 10-20 minutes. The robot operator at site can do the programming, and no system integrator is needed.

The invention enables smaller batch sizes, higher flexibility, and simplified integration.

According to an embodiment of the invention, the system comprises a second memory location for storing the defined workstations and the selected sequences of programming blocks, a program executer configured to execute the guiding tool and to display the second wizard, and a robot program generator configured to generate a robot program based on the robot code of the selected sequences of programming blocks for the selected workstations, and the parameters input in response to the displayed instructions.

According to an embodiment of the invention, said sequence of views also includes questions regarding the workstations in the specific robot cell, and the program code of at least some of the programming blocks is interactive and configured to adjust said sequence of views depending on user input in response to the displayed questions. Thus, the second graphical user interface is dynamic and changes depending on the user input.

According to an embodiment of the invention, the parameters include waypoints on movement paths for the robot. During teaching of the robot, the user determines the actual positions on the movement paths for the robot at the workstations. Existing practice for programming a robot involves teaching the robot a sequence of waypoints. The waypoints define the movement path, which the robot shall follow during execution of the robot program. A waypoint comprises three-dimensional position and three-dimensional orientation information. The robot is taught how to perform the task by being guided through the various waypoints along the desired operating path during the programming.

According to an embodiment of the invention, the first graphical user interface allows a user to define an entry point for each of the workstations and to specify first movement paths for the robot between the defined entry points, and the robot program generator is configured to generate the robot program based on the first movement paths. In this embodiment, the first graphical user interface includes a sequence of views with instructions for guiding the first user to program movement paths between the defined workstations in the specific robot cell. The first user programs all the movement paths between the workstation within the robot cell. The paths need to be safe in order to avoid collisions. The integrators job is to program all the safe paths between the stations within the robot cell.

According to an embodiment of the invention, the second graphical user interface allows a user to specify second movement paths for the robot from the entry points for carrying out the tasks at the selected workstations, and the robot program generator is configured to generate the robot program based on the specified second movement paths. In this embodiment, the second graphical user interface includes a sequence of views with instructions for guiding the second user to program movement paths for carrying out the tasks at the selected workstations. Preferably, the robot program generator is configured to generate the robot program based on the specified first and second movement paths. The second user only needs to program the paths at the workstations, which depends on the properties of the object that is to be processed at the workstation, and which may vary depending on the application and the product being produced.

According to an embodiment of the invention, the program code for generating a graphical user interface comprises accommodations for optional text to be presented to the user, and the first graphical interface is configured to allow a user to input text with instructions and questions to the user, and said programming tool generator is configured to fill in the text received from the user in said accommodations. This embodiment allows the integrator to input text with instructions and questions to the operator in the first part of the programming. The text input by the integrator is included in the sequence of views generated by the guiding tool and displayed to the operator during the second part of the programming. The operator answers the questions and carries out actions in respond to the text. The generation of the robot programming depends on the user response to the questions and instructions. This embodiment allows the integrator to include text with instructions and questions to the operator, which are adapted to the specific robot cell. The guiding tool for the specific robot cell will then include the instructions and questions for the robot cell.

According to an embodiment of the invention, the first graphical user interface allows a user to specify the actual positions of the workstations in the specific robot cell.

According to an embodiment of the invention, the second graphical user interface allows the user to specify the order in which the robot is going to visit the workstations, and the robot program generator is configured to generate the robot program based on the specified order for visiting the workstations. This embodiment enables the operator to change the order in which the robot is visiting the workstations. Thus, the same guiding tool can be used for reprogramming the sequence of visiting the workstations by the robot. There is no need to involve the integrator for reprogramming the robot when the order is changed.

According to an embodiment of the invention, the system comprises a first computing unit including a first display device, user input means, and said programming tool generator, and said graphical generator is configured to display the first graphical user interface on the first display device, and a second computing unit configured to receive the generated guiding tool, and comprising a memory location for storing the guiding tool, a second display device, user input means, a program executer configured to execute the guiding tool to display the second graphical user interface on the second display device, and said robot program generator. In this embodiment, the first part of the programming is carried out at the first computing unit and the second part is carried out at the second computing unit. The guiding tool and the robot code for the selected sequences of programming blocks for the workstations of the specific robot cell must then be transferred to the second computing unit. This transfer can be done in many different ways.

The first computing unit can be any type of computer, for example, a personal computer PC. Preferably, the second computing unit is portable control unit connected to the robot and adapted for providing manual control of the robot. The portable control unit is defined as a device for jogging and programming the robot. The portable control unit can, for example, be a traditional teach pendant unit (TPU). A TPU includes operator control means, for example, a joystick, a ball, or a set of buttons, which the operator uses to instruct the robot movement. The portable control unit can also be a general purpose device, such as a smart phone or a tablet computer, adapted to communicate with the robot controller used together with a separate joystick. By following the instructions in the generated guide the operator steers the robot with the joystick and saves waypoints.

According to a second aspect of the invention, this object is achieved by a computer based method for programming an industrial robot as defined in claim 9.

The method comprises:
providing a plurality of programming blocks, each of the programming blocks including robot code comprising program instructions for the robot to carry out a part of a task, and at least some of the programming blocks include program code comprising program instructions for generating a graphical user interface for guiding a user to program the part of the task,
generating a first wizard including a first graphical user interface allowing a user to define a plurality of workstations and to select a sequence of said programming blocks for each of the defined workstations, and to define at least one specific robot cell including one or more of said defined workstations,
receiving user inputs regarding selected sequences of said programming blocks for the defined workstations,
storing the defined workstations of the specific robot cell, and
generating a guiding tool for programming said at least one specific robot cell based on the defined workstations, and the program code comprising program instructions for generating a graphical user interface in the selected sequences of programming blocks for the defined workstations, wherein the guiding tool includes program code for generating a second wizard comprising a graphical user interface including a sequence of views including instructions for guiding a user to program the specific robot cell.

The guiding tool is generated by combining the program code comprising program instructions for generating a graphical user interface in the selected programming blocks. Preferably, the program code is combined so that the combined program code reflects the sequence of the programming blocks for the work stations. Thus, the programming sequence becomes correct and logical for the programmer.

According to an embodiment of the invention, the method further comprises:
executing the guiding tool,
displaying the second graphical user interface allowing the user to select one or more of the workstations in the specific robot cell, and to input parameters in response to the displayed instructions,
receiving user inputs in response to the displayed instructions, and
generating a robot program based on the robot code of the selected sequences of programming blocks for the selected workstations, and the received user inputs.

According to an embodiment of the invention, the method comprises generating a graphical user interface including instructions for guiding a user to program the work station for each of the defined workstations based on the program code in the selected programming blocks, and generating said guiding tool based on the generated graphical user interfaces for the defined workstations of the specific robot cell.

According to an embodiment of the invention, the first graphical user interface is generated on a first programming unit, the second user interface is generated on a second computing unit, the guiding tool is generated on the first programming unit and the robot program is generated on the second programming unit, and the method comprises transferring the guiding tool and the robot code of the selected sequences of programming blocks for the workstations of the specific robot cell from the first computing unit to the second programming unit.

According to an embodiment of the invention, the first graphical user interface allows a user to define an entry point for each of the workstations and to specify first movement paths for the robot between the defined entry points, the second graphical user interface allows a user to specify second movement paths for the robot from the entry points for carrying out the tasks at the selected workstations, and the method comprises receiving first movement paths from a first user, receiving second movement paths from a second user, and generating the robot program based on the first and second movement paths.

According to an embodiment of the invention, said sequence of views includes questions regarding the workstations in the specific robot cell, and the method comprises displaying the views with the questions, receiving response to the displayed questions, and adjusting the second user interface in depending on the response to the displayed questions.

It is easy to realize that the method according to the invention, as defined in the appended set of method claims, is suitable for execution by a computer program having instructions corresponding to the steps in the inventive method when running on a processor unit. Even though not explicitly expressed in the claims, the invention covers a computer program product in combination with the method according to the appended method claims.

According to a further aspect of the invention, the object is achieved by a computer program directly loadable into the internal memory of the computer or a processor, comprising software code portions for performing the steps of the method according to the invention, when said program is running on a computer. The computer program product is provided either on a computer readable medium or through a network, such as the Internet.

According to another aspect of the invention, the object is achieved by a computer readable medium having a program recorded thereon, when the program is to make a computer perform the steps of the method according to the invention, and said program is running on the computer.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

According to the invention, the programming of an industrial robot is split up into a first and a second part, which can be carried out by two different users with different programming skills. In one embodiment of the invention, the system comprises a first computing unit configured to execute a first programming part and a second computing unit configured to execute a second programming part. However, it is also possible to execute both programming parts on the same computing unit.

Figure 1:
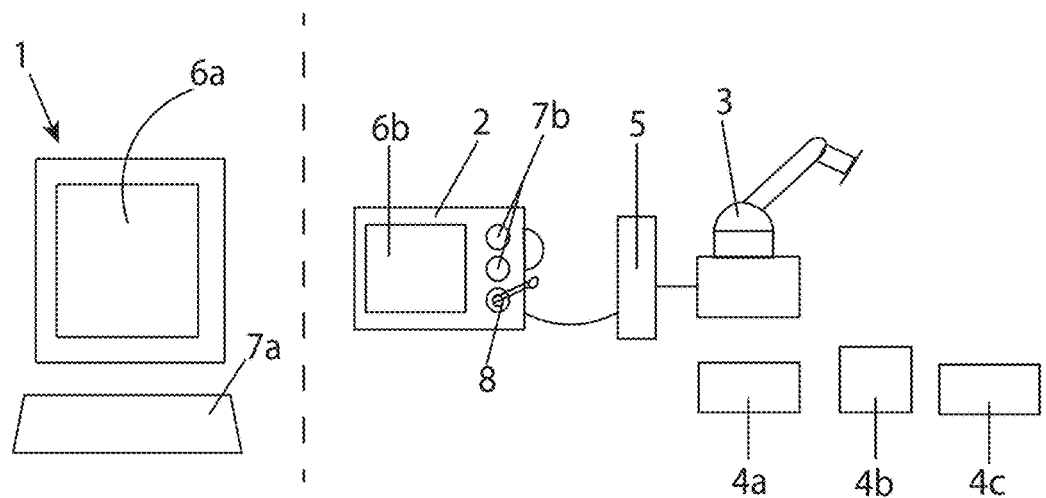
FIG. 1 shows an example of a first and a second computing unit for programming an industrial robot to carry out work in a robot cell including a plurality of workstations.

FIG. 1 shows an example of a first and a second computing unit 1, 2 for programming an industrial robot 3 to carry out work in a robot cell including a plurality of workstations. The robot cell includes a robot 3 and a plurality of workstations 4a-c. The industrial robot includes a robot controller 5 for controlling the motions of the robot 3. In this example, the workstations are an input pallet 4a for not yet machined objects, a machine 4b for machining the objects, and an output pallet 4c for finished objects. The first computing unit 1 includes a first display device 6a, such as a computer screen, and first user input means 7a, for example a keyboard and a computer mouse, to enable a user to input data and interact with the computing unit 1. The first programming unit is, for example, a PC, a tablet computer, or any other suitable computer unit. The second computing unit 2 includes a second display device 6b, for example, a screen such as a touch screen, and second user input means 7b, such as a touch screen, and/or buttons, to enable a user to input data and interact with the second computing unit 2. The second computing unit 2 may also include a joystick 8 for jogging the robot. The first and second computing unit include data processing means, such as such as a central processing unit (CPU) and memory means, such as ROM and RAM.

An industrial robot typically comprises a mechanical unit, in the following called a robot 3, movable about a plurality of axes, a robot controller 5 configured to control the motions of the robot, and a portable control unit 2 having a user interface adapted to communicate with the robot controller and to enable programming of the motions of the manipulator. The portable control unit is generally denoted a Teach Pendant Unit (TPU). A TPU includes operator control means, for example, a joystick, a ball, or a set of buttons, which the operator uses to instruct the robot movement. The TPU further comprises an enabling device, for example, a dead man's switch or a push button, which has to be pressed by the operator to enable manual control of the robot by the TPU. In this embodiment, the second programming unit 2 is the TPU of the robot. However, in another embodiment, the second programming unit 2 can be a general-purpose device, such as PC or a tablet computer, adapted to communicate with the robot controller. If a general-purpose device is used as the second computing unit, the general-purpose device is provided with one or more software modules adapted to configure the existing user interface of the device to enable a user to input jog instructions to the device, and to generate and send jog commands to the robot controller in response to user interactions with the user interface. The second computing unit 2 may include a graphical user interface enabling a user to jog the robot and teach the robot movement paths. In another embodiment, a separate joystick can be used for jogging the robot during teaching of the movement paths.

Figure 2:
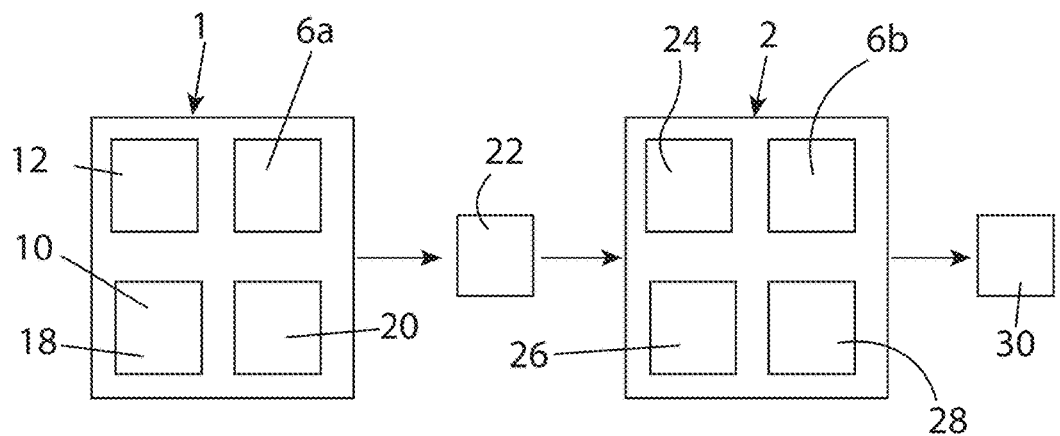
FIG. 2 shows a schematically an example of a system for programming an industrial robot according to the invention.

FIG. 2 shows schematically an example of a system for programming an industrial robot according to the invention. In this example, the system comprises the first computing unit 1 and the second computing unit 2. However, in another embodiment it is possible to have only one computing unit. An advantage with using two computing units is that they can be arranged at different locations. This means that the system integrator can carry out the first part of the programming at a remote location. The second part of the programming has to be done in the robot cell.

The system comprises a first memory location 10 for storing a plurality of programming blocks, each of the programming blocks includes robot code comprising program instructions for the robot to carry out a part of a task and program code comprising program instructions for generating a graphical user interface for guiding a user to program the part of the task. The robot code is written in a robot programming languages, i.e. a programming language especially designed for programming industrial robots. The robot code includes a sequence of program instructions written in a robot programming language, where each instruction tells the robot controller what to do and how to do it. The robot code is executed by the robot controller 5. The program code comprises program instructions for generating a graphical user interface and can be written in any known programming language for generating a graphical user interface, for example, C-sharp. The program code in the programming blocks can be compiled code. Preferably, each of the programming blocks comprises program code for generating a graphical user interface for guiding. However, it is possible to have programming blocks, which only include robot code.

The system further comprises a first graphical generator 12 configured to generate a first wizard including a first graphical user interface allowing a user to define a plurality of workstations and to select a sequence of the programming blocks for each of the defined workstations, and to define a specific robot cell including one or more of the defined workstations. The system comprises a first display device 6b, and the first graphical generator 12 is configured to display the first graphical user interface of the first wizard on the first display device. The system enables a user to define workstations corresponding to the real workstations in the robot cell. The user can determine a task for the robot to be carried out at the workstation by selecting a sequence of the programming blocks for each of the defined workstations. The selected sequence of programming blocks determines the order of execution of the task parts so that they together carry out the desired task at the workstation. By executing the robot code in the selected programming blocks in accordance to the selected sequence, the robot will perform the desired task. For example, the task "pick object from input palette" can be programmed by selecting the task parts "Approach the palette"+"Pick from stack"+"Retract".

Figure 3:
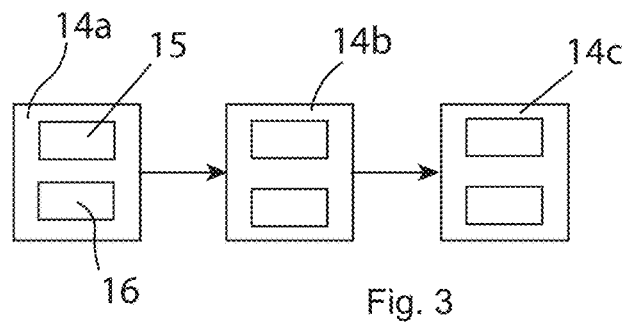
FIG. 3 illustrates an example of a sequence of programming blocks for a defined workstation.

FIG. 3 shows an example of a sequence of programming blocks 14a-c selected for a workstation "Input palette". Each of the programming blocks includes robot code 15 for carrying out one of the task parts "Approach the palette", "Pick from stack", and "Retract", and program code 16 for generating a graphical user interface (GUI) for guiding a user to program the task part. The order of the programming blocks determines the order of execution of the task parts and also the order in which the GUIs are to be displayed to the user during the second part of the programming.

The system comprises a second memory location 18 for storing the defined workstations and the selected sequences of programming blocks. The system may comprise a library of defined workstations. When a new workstation has been defined, it can be stored in the library and can be used later for defining other robot cells. The user can choose to define a new workstation or to use a previously defined workstation from the library.

The first graphical user interface may be designed to allow the user to specify the actual positions of the workstations in the specific robot cell. In one embodiment of the invention, the first graphical user interface allows a user to define an entry point for each of the workstations and to specify first movement paths for the robot between the defined entry points. An entry point is a point defined in the vicinity of the workstations, preferably close to the entrance of workstation, and suitable for the robot to pass through upon entering the workstation. This embodiment enables the user to input the actual positions of the entry points and defines safe movement paths for the robot between the entry points to the workstations.

The program code for generating the first graphical user interface may comprise accommodations for optional text to be presented to the operator during the second part of the programming, and the first graphical interface is configured to allow the integrator to input text with instructions and questions to the operator. The programming tool generator is configured to fill in the text received from the user in said accommodations.

The system further comprises a programming tool generator 20 configured to generate a guiding tool 22 for programming a specific robot cell based on the program code in the selected sequences of programming blocks for the workstations in the specific robot cell. The guiding tool 22 includes program code for generating a second wizard including a second graphical user interface for guiding a user to program the specific robot cell. When the user has defined all the workstations in the robot cell, the guiding tool 22 can be generated. The programming tool generator 20 collects the program code from the programming blocks of the workstation according to the selected order of the programming blocks and put them together to a program file including program code for generating a second graphical user interface, also denoted the second wizard, including a sequence of views including instructions for guiding a user to program each of the workstations of the robot cell. The second wizard allows the user to select one or more of the workstations in the specific robot cell and to input parameters in response to the displayed instructions.

In this embodiment, the programming tool generator 20 and the first graphical generator 12 are software modules stored at the first computing unit and executed by the first computing unit.

The programming tool generator 20 is also configured to generate a robot program file including robot code for programming the workstations based on the robot code in the selected sequences of programming blocks. The programming tool generator 20 collects the robot code from the programming blocks of the workstation according to the selected order of the programming blocks, and put them together to a robot program file including robot code for each of the workstations. If the user has specified movement paths between the workstations, the programming tool generator 20 is also configured to generate the robot program file based on the specified movement paths. The guiding tool 22 may comprise the robot program file including robot code for each of the workstations as well as the program file including program code for generating the second graphical user interface.

The guiding tool and the robot code for the selected sequences of programming blocks for the workstations of the specific robot cell can be transferred to a second computing unit 2. The guiding tool and the robot code is, for example, transferred in the form of a XML-file 22. This transfer can be done in many different ways. For example, the first computing unit 1 can be configured to transfer the guiding tool and the robot code to the second computing unit 2. Alternatively, the guiding tool and the robot code are manually transferred via an USB unit or electronically via an e-mail.

The system also comprises a program executer 24 configured to execute the guiding tool and to display the second graphical user interface. In this example, the program executor is located at the second computing unit 2 and the second part of the programming is carried out at the second computing unit 2. The second computing unit 2 is configured to receive the guiding tool and the robot program file including robot code for the workstations from the first computing unit, and includes a memory location 26 for storing the guiding tool and the robot code. In this example, the program executer 24 is configured to display the second graphical user interface on the second display device 6b.

The second user interface is designed to allow a user to select one or more of the defined workstations for the robot cell. The second user interface is designed to step by step display questions and instructions to the user for each of the selected workstations, and to allow the user to input parameters and make choices in response to the displayed instructions and questions. In this example, the second graphical user interface allows a user to select the order the robot is going to visit the workstations. For example, the robot shall first visit the input pallet 4a, then visit the machine 4b, and at last visit the output pallet 4c. The second graphical user interface allows a user to specify movement paths for the robot for carrying out the tasks at the selected workstations. This is, for example, done teaching the robot a plurality of waypoints on the movement paths. In this case, the parameters are the positions and orientations of the waypoints.

The system also comprises a robot program generator 28 configured to generate a robot program based on the robot code of the selected sequences of programming blocks for the selected workstations, and the received parameters. The program generator 28 fills in the parameters in the robot code for the selected workstations, and merges the robot code from the selected workstations in dependence on the selected order for the robot to visit the workstations. The file 30 with the robot program is suitably transferred to the robot controller for execution.

Figure 4:
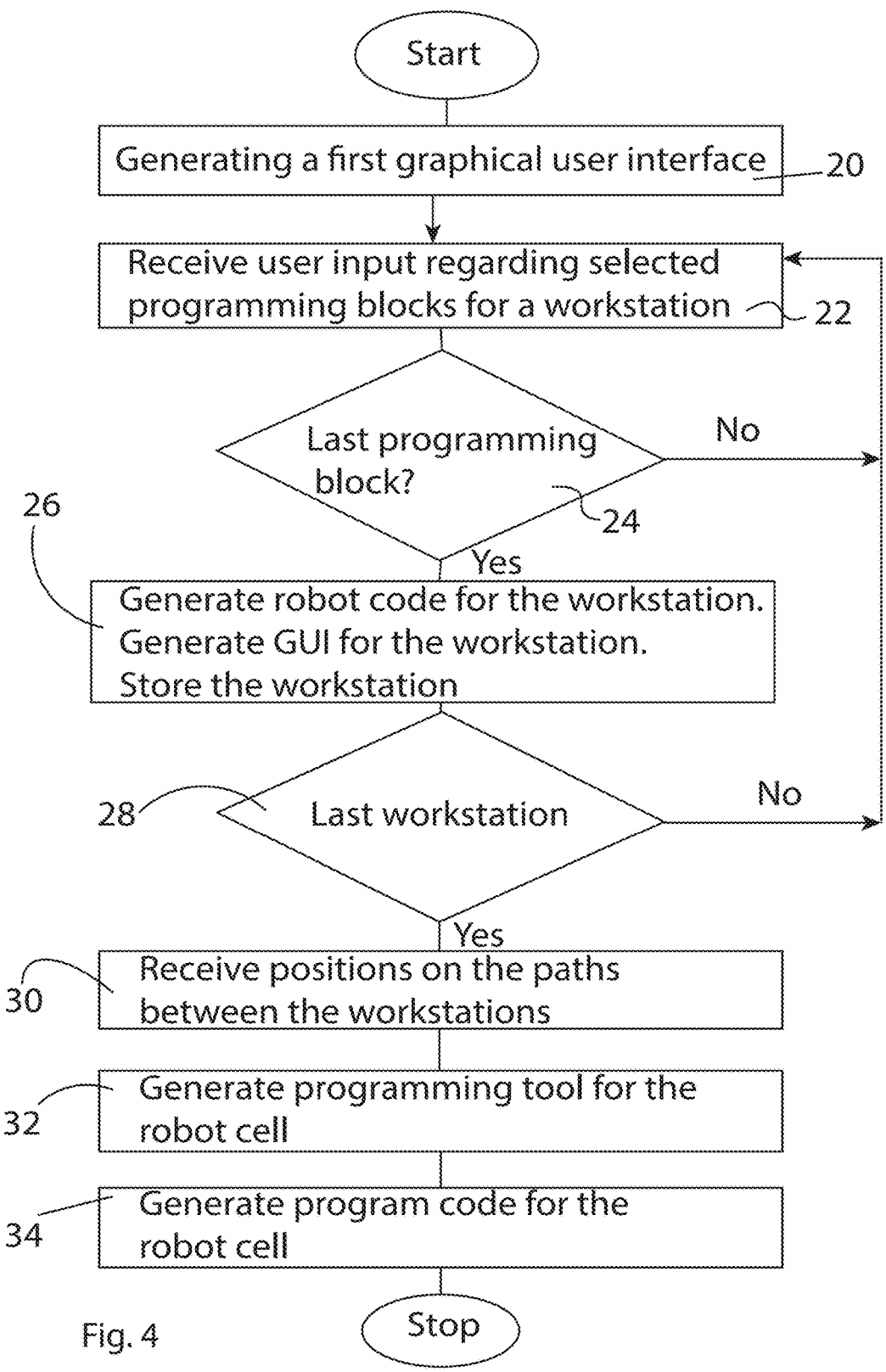
FIG. 4 shows a flowchart for an example of a first part of a method for programming an industrial robot according to the invention.

FIG. 4 shows a flowchart illustration for a first part of a method for programming an industrial robot to perform work in a robot cell including a plurality of workstations according to an embodiment of the invention. It will be understood that each block of the flow chart can be implemented by computer program instructions. The first part of the method can be executed on a first computing unit. The first part of the method can be carried out by a first user, for example, a system integrator.

A plurality of programming blocks has been defined and stored in advance. Each of the programming blocks includes robot code for the robot to carrying out a part of a task. At least some of the programming blocks also include program code for generating a graphical user interface for guiding a user to program the part of the task.

Figure 6A:
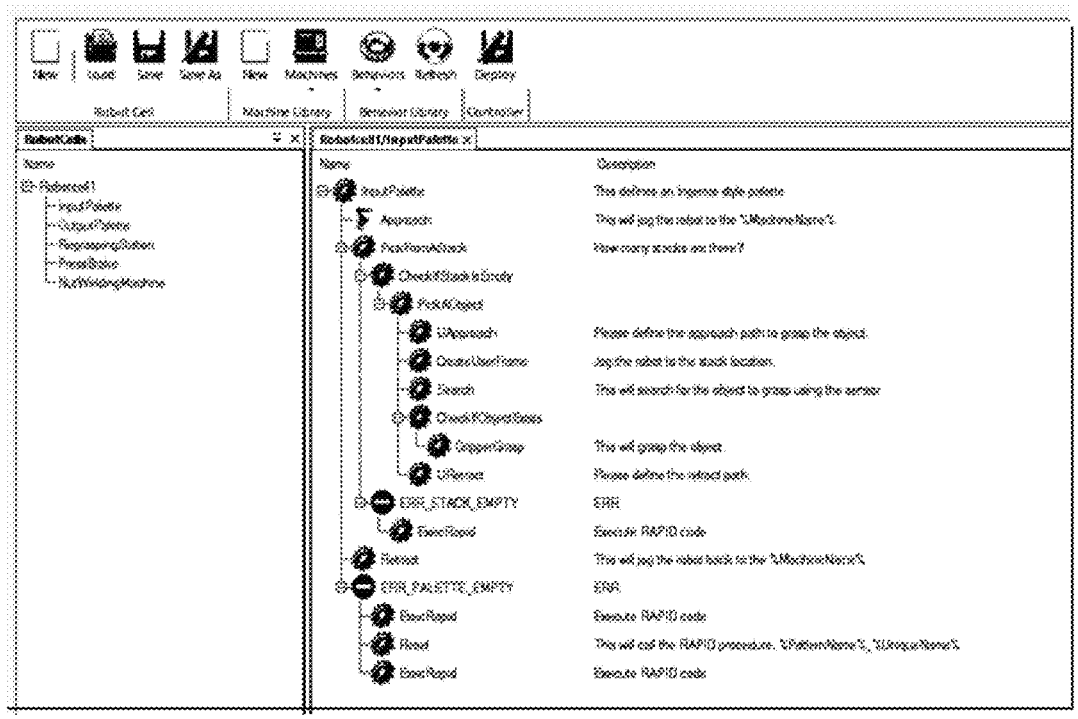
FIGS. 6a-b show an example of a view in a first graphical user interface for programming the robot.
Figure 6B:
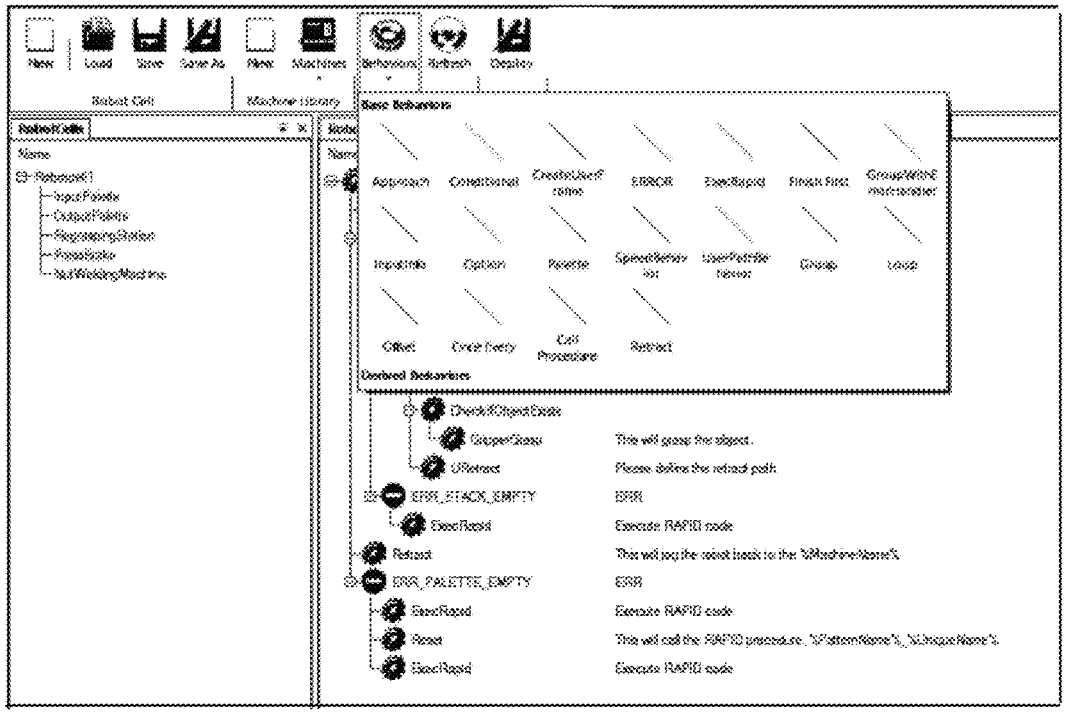

In a first step, a first graphical user interface is generated and displayed to the first user, block 20. The first graphical user interface is a sequence of views for guiding the user to define the workstations in the robot cell. FIGS. 6a and 6b show an example of a view in a first graphical user interface shown to the user. The views in the first graphical user interface show the defined programming blocks for the parts of the tasks, and allow the user to define a plurality of workstations and to select a sequence of programming blocks for each of the defined workstations. The next step in the method is to step through the sequence of views and to receive user inputs, such as the selected programming blocks, in response to the displayed views, block 22. The first user may also input text with questions and instructions to the second user regarding how to program the task parts. The first user selects programming blocks and enters text for a workstation until the last programming block has been selected for the workstation, block 24. When the workstation has been defined, the workstation is stored. Programming code for the defined workstation is generated based on the robot code for the selected sequence of programming blocks, block 26. A graphical user interface for guiding the second user to program the defined workstation is generated based on the selected sequence of programming blocks and the text with instructions and questions input by the first user, block 26. In this step, the text with instructions and questions received from the user is filled in the accommodations of the program code. In another embodiment, step 26 can be carried out later, for example, after the last station has been defined or when the guiding tool is generated. Steps 22-26 are repeated until all of the workstations in the robot cell have been defined and stored, block 28.

In a next step, the first user may input positions of entry points to the workstations and waypoints on movement paths between the entry points. The positions of entry points to the workstations and waypoints on movement paths are received and stored, block 30. When the user has defined the workstations in the robot cell and input paths between the workstations, a guiding tool for programming the robot cell is generated, block 32. In this embodiment, the guiding tool is generated based on the graphical user interfaces for the defined workstations for the robot cell. In an alternative embodiment, the guiding tool for programming is generated cell based on the program code in the selected sequences of programming blocks for the workstations of the robot cell and the text input by the user. The guiding tool can be transferred to a second computing unit.

The implementation of the steps 20-34 are preferably made by a computing unit comprising software code portions, such as a computer program, comprising instructions for carrying out the steps of the method, and hardware, such as a processor, memory and input/output devices, for carrying out the instructions of the computer program.

Figure 5:
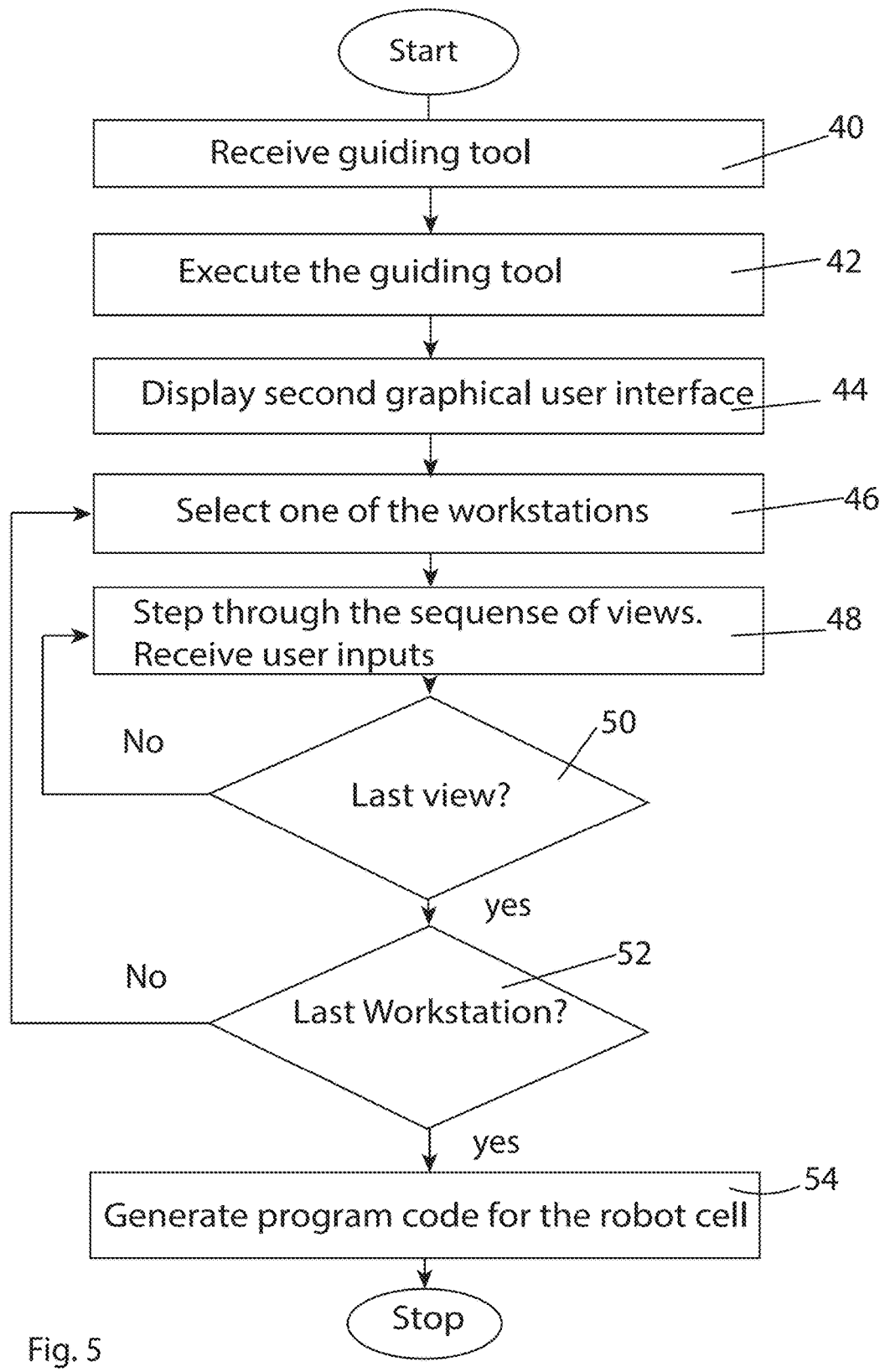
FIG. 5 shows a flowchart for an example of a second part of a method for programming an industrial robot according to the invention.

FIG. 5 shows a flowchart illustration for a second part of a method for programming an industrial robot according to an embodiment of the invention. It will be understood that each block of the flow chart can be implemented by computer program instructions. The second part of the method can be executed on the same computing unit as the first part of the method, or on a second computing unit. The second part of the method is suitably carried out by a second user, for example, a robot operator in the robot cell.

If the second part has been performed on another computer, the guiding tool is received by the second computer, block 40. The guiding tool is executed, block 42. When the guiding tool is executed, a second graphical user interface including a sequence of views including instructions for guiding a user to program the robot cell is displayed, block 44. The second graphical user interface allows the user to select one or more of the workstations in the robot cell, block 46. When the user has selected one of the workstations, the user interface for the selected workstation is displayed to the user. The user steps through the views in the user interface for the selected workstation and input parameters and in response to the displayed instructions and responds to the displayed questions, block 48. The user inputs are received. The user interface can be changed in dependence on the user choice. For example, the number of views displayed may vary in dependence on the user choice. The user can, for example, teach the robot a movement path or how to grasp an object at the workstation in response to the displayed instructions.

When all the views of the user interface have been stepped through, the next workstation can be selected, block 50 and 52. When the user selects a new workstation, the user interface for the selected workstation is displayed to the user. The steps 46, 48 and 50 are repeated until the last workstation has been selected. The user selects the workstations in the same order in which the robot is going to visit the workstations. The second user specifies the sequence of workstations needed to accomplish the task, for example, to create a certain product. The user can select one or more of the defined workstations, and one workstation can be selected several times. In an alternative embodiment, the user determines the order in which the robot is going to visit the workstations after the last workstation has been defined, i.e. between blocks 52 and 54. The user inputs regarding selected order for visiting the workstations are received.

In a last step, a robot program is generated based on the robot code of the selected sequences of programming blocks for the selected workstations, the selected order for visiting the workstations, and the received parameters, block 54. The robot program is transferred to the robot controller. The implementation of the steps 40-54 are preferably made by a computing unit comprising software code portions, such as a computer program, comprising instructions for carrying out the steps of the method, and hardware, such as a processor, memory and input/output devices, for carrying out the instructions of the computer program.

The programming of the robot cell is split up into two parts, assisted by a first wizard for the integrator and a second wizard for the operator. The integrators job is to set up the robot cell, including the configuration of the workstations inside the robot cell, all the safe paths between all workstations within the robot cell, i.e. from home position to the input palette, and the logic behind the second wizard to be generated. Then the operator's job is just to define the details inside each workstation by following the second wizard generated by the integrator program, i.e. how to pick up an object from the input palette, and fine adjustments of inserting the object into the machine. This gives the operator the freedom to specify paths and points at each station for different types of parts to create different types of products.

The first wizard is a tool to create a guiding tool, which governs the operation of the second wizard, i.e. the end-user wizard. It also creates a task level programming environment, where the whole process of programming the robot cell is broken down in to tasks (workstations), which are even further broken down to small task parts. Each task part has a corresponding programming block. The task parts are the smallest units in the system, where every task part accomplishes a small section of a high level task. The task parts have variety of functions, e.g. teaching paths, measuring distances, creating loops, and collecting information from the user. Workstations can be created by adding task parts.

The second graphical user interface acts as a guide for the operator by explaining all the steps in the process of creating a program for a product. The operator only needs to know what sequence of stations are needed to create the product. The application is meant for the robots teach pendant (Display and joystick) or other tablet PC's or similar together with a separate joystick. By following the instructions in the generated guide, the operator steers the robot with the joystick and saves points, teaching as they go and by moving a physical part around during the teaching which at the end of teaching has become the final product.

The first and second graphical user interface are generic and dynamic for all applications. They changes based on the operators or integrators input. Since each step needs to be approved by the operator, the second wizard also takes safety in account, since the user needs to approve each step, making the operator aware of the current or coming actions. An execution of some movements will always happen after the operator has approved the action. All large movements and paths for the robot are already set, so this brings safety of robot programming to a new level. The risk of by mistake causing an incorrect robot motion somewhere in the program is by this significantly reduced compared to conventional robot programming.

The second graphical user interface (the second wizard) can also handle communication and interaction with other cloud based system, such as web services or mobile devices. This can be used for status information and alarms to operator when the robot is operating, e.g. "Input material is empty in five minutes" or a fault has occurred.

FIGS. 6a and 6b are screenshots from the first graphical user interface. FIG. 6a shows programming of an input pallet. On the left panel the robot cell and the workstations in the robot cell are shown. On the right side, the task parts building up the task to be carried out by the robot at the input palette are shown. FIG. 6b shows a drop down list with a plurality of task parts, which can be selected for programming a workstation.

Figure 7A:
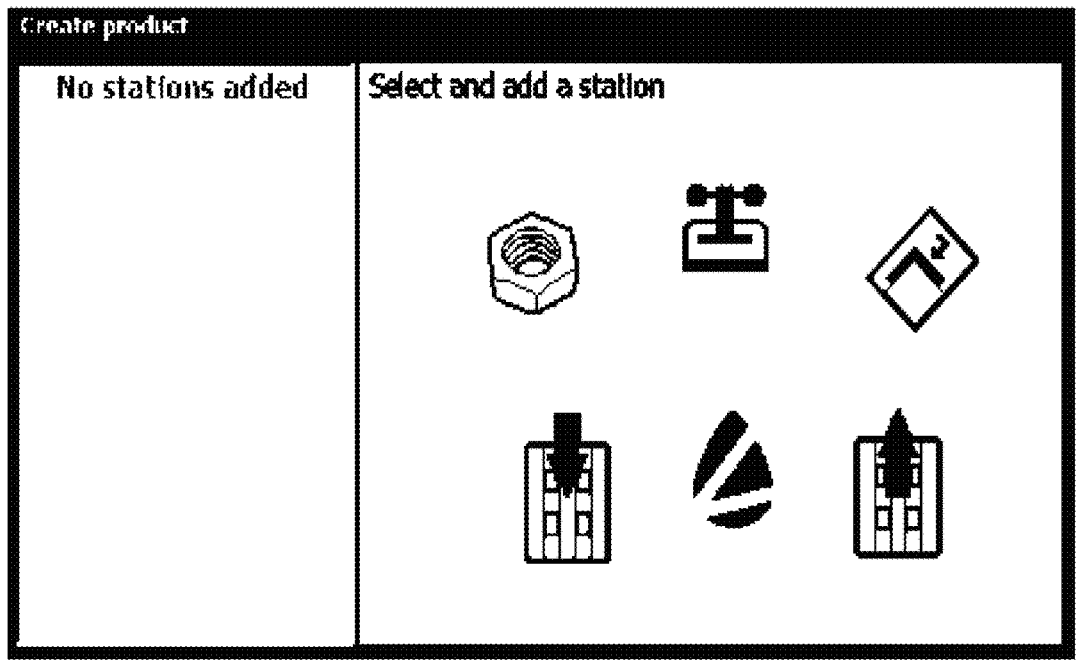
FIGS. 7a-h show an examples of a sequence of views in a second graphical user interface for programming the robot.

FIGS. 7a-h shows examples of a sequence of views in a second graphical user interface for programming the robot. The operator starts the application and a start page is shown. The operator can choose between creating a new product or load an already existing one from file. When a product has been loaded, the product name is displayed together with other information for that specific product. When the operator creates a new product, an interface of the robot cell will be shown, giving the operator the possibility to choose which stations inside the robot cell they would want to program in order to create the product, as shown in FIG. 7a. This interface will be shown on every start of creating a product and in between programming each workstation. The interface changes automatically and adds the workstations and knows their positions based on the configuration done by the system integrator. The input palette is selected and can now be added to the sequence of stations used to create the product.

Figure 7B:
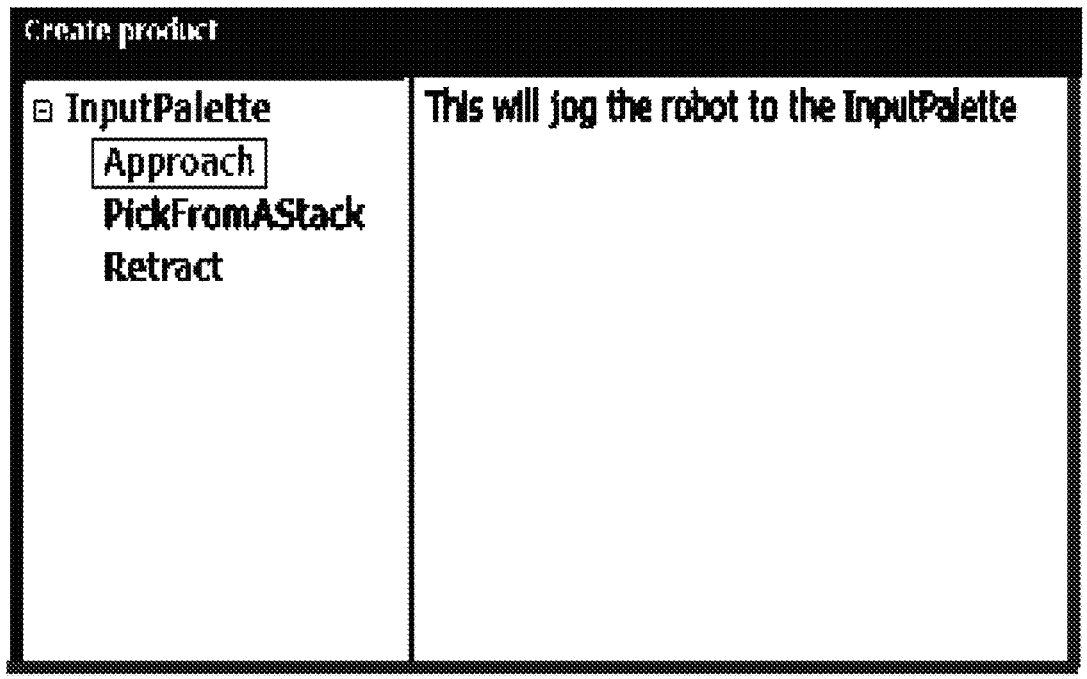

Now the input pallet has been added to the list of stations to the left, as shown in FIG. 7b, and the first view of the user interface of that workstation is now shown to the right. The item with the dark background is the current task part to be programmed. The list to the left acts as a tree, where every root node is a workstation and every leaf is a task part to be carried out inside that station. The operator will need to approve each task part in order to complete the programming of the workstation. The operator is programming the product by teaching (moving objects physically or virtually) and the list of task parts to the left acts as a guide of what order the resulting generated code will execute in.

Figure 7C:
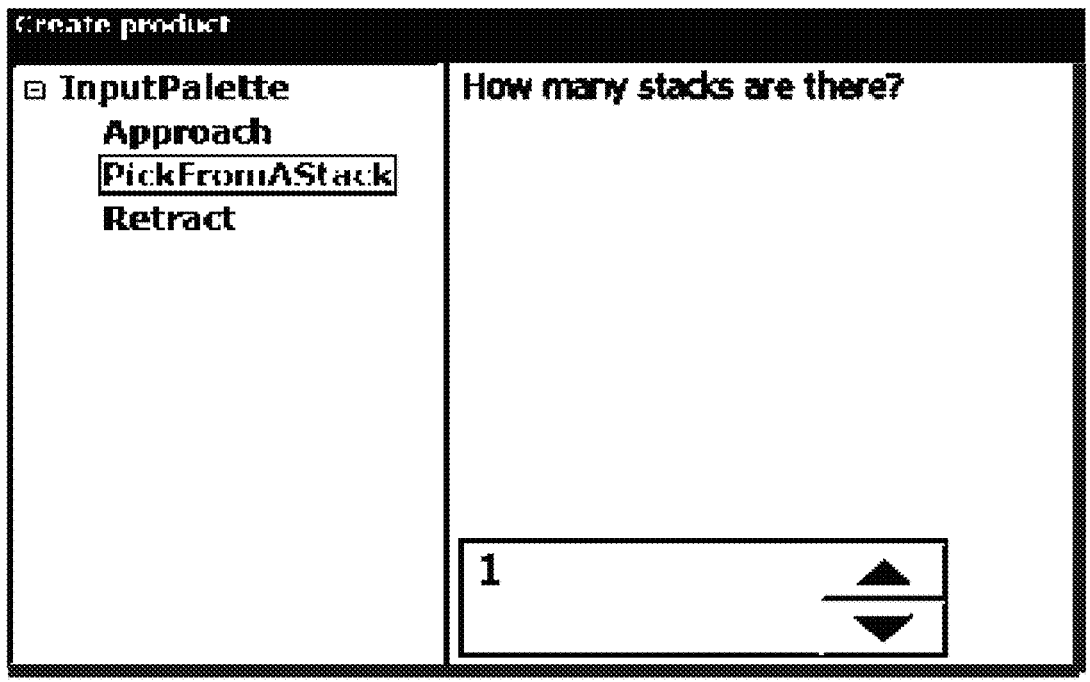
Figure 7D:
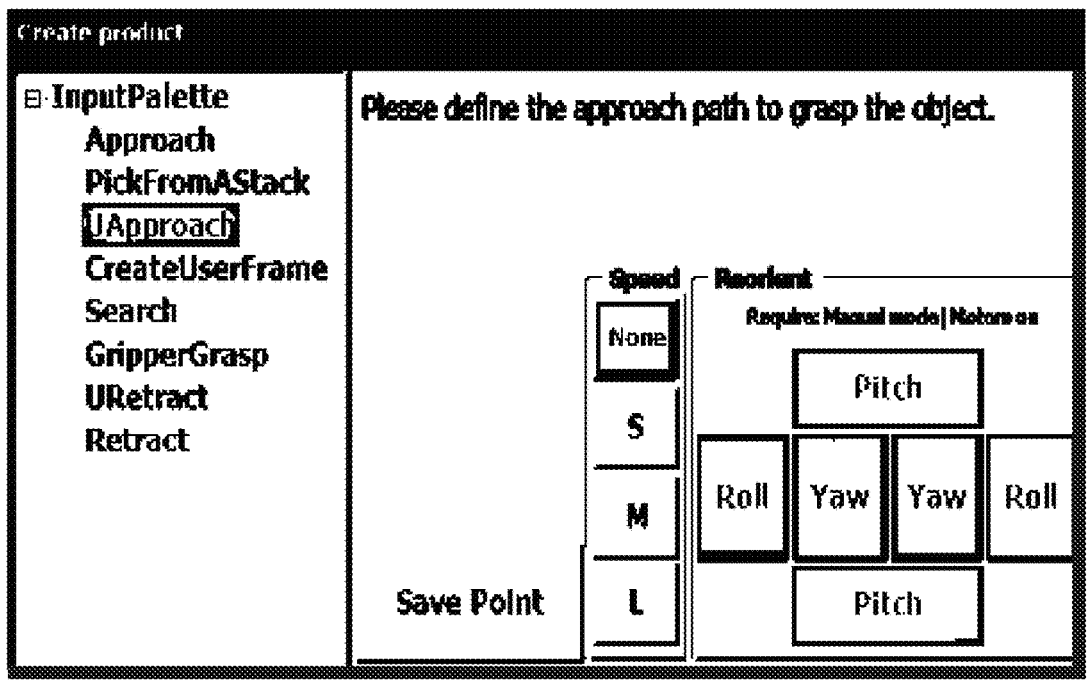
Figure 7E:
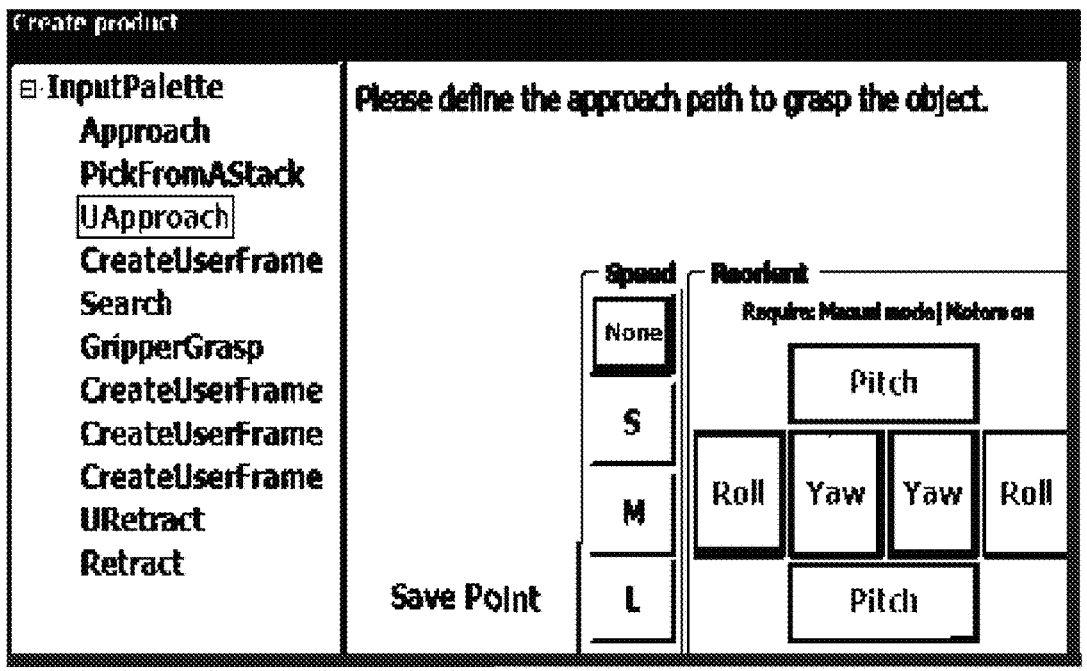

When the operator has finished programming of the first task part, he steps to the next task part in the tree, as shown in FIG. 7c. During this step the operator is given a choice, and depending on the operator answers, the second user interface will adjust accordingly, e.g. one stack would result in the sequence of views as shown in FIG. 7d. If the operator instead chooses a number of four stacks, the second user interface generates another sequence of views, shown in FIG. 7e. Each view defines a graphical user interface (GUI).

Figure 7F:
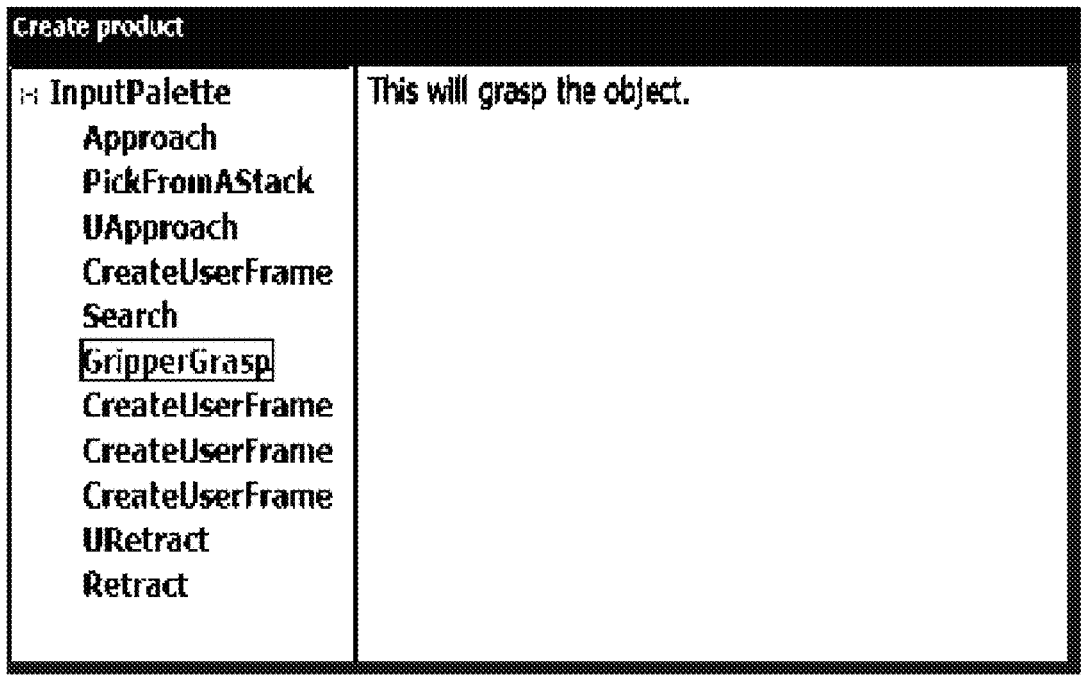

The different views work as a guide for the operator. Depending on the need of the task, different views are used. In FIG. 7f a simple case is shown ("GripperGrasp"), the text explains the next action, and when the operator approves this step then the action will be executed. In this example, approving the step won't change the resulting generated code in any way but is required in order to grasp the physical object while teaching and also gives the user a clue of how the robot will grasp the object.

Figure 7G:
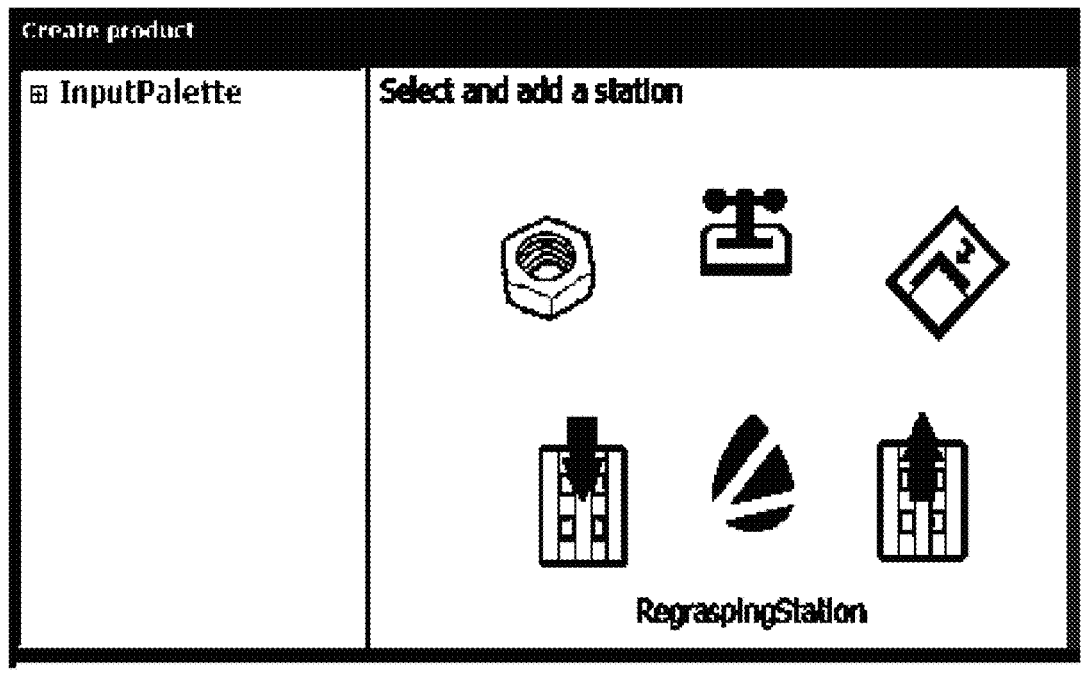
Figure 7H:
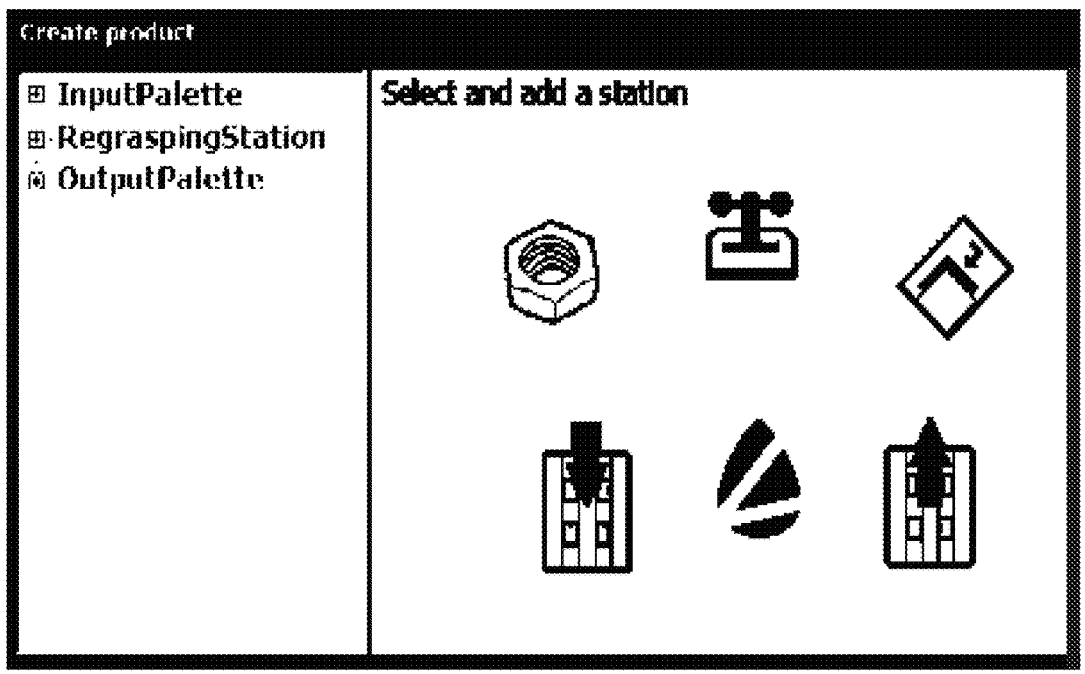

The programming of the input palette is now completed. When the operator is finished with the product it can be saved by, for example pressing a button "done". This brings the operator back to the robot cell interface, as shown in FIG. 7g. The next workstation can now be selected among the defined workstations in the robot cell, and the new workstation will be added to the list of stations, as shown in FIG. 7h. After saving a product or loading it from file, the robot code is generated and information about the product is displayed on the start page.

The present invention is not limited to the embodiments disclosed but may be varied and modified within the scope of the following claims. For example, the steps in the method can be carried out in different order. It is also possible to build a new programming block from several programming blocks. Thus, a programming block may contain a plurality of programming blocks. The invention can also be used for programming more than one robot cell. Each of the robot cells can then be defined as described above.

The invention claimed is:

1. A system for programming an industrial robot to perform work in a robot cell including a plurality of workstations, the system comprising:
 a first memory location for storing a plurality of programming blocks including robot code comprising program instructions for the robot to carrying out a part of a task, and at least some of the programming blocks comprises program code including program instructions for generating a graphical user interface for guiding a user to program the part of the task, a graphical generator configured to generate a first wizard including a first graphical user interface allowing a user to define a plurality of workstations, to select a sequence of said programming blocks for each of the defined workstations, and to define a specific robot cell including one or more of said defined workstations, and a programming tool generator configured to generate a guiding tool for programming the specific robot cell based on the program code of the selected sequences of programming blocks for the workstations in the robot cell, wherein the guiding tool comprises program code for generating a second wizard having a second graphical user interface comprising a sequence of views including instructions for guiding a user to program the specific robot cell, and allowing the user to select one or more of the workstations in the specific robot cell, and to input parameters in response to the displayed instructions.

2. The system according to claim 1, the system further comprising:

a second memory location for storing the defined workstations and the selected sequences of programming blocks, a program executer configured to execute the guiding tool and to display the second wizard, and a robot program generator configured to generate a robot program based on the robot code of the selected sequences of programming blocks for the selected workstations, and the parameters input in response to the displayed instructions.

3. The system according to claim 1, wherein said sequence of views of the second wizard also includes questions regarding the workstations in the specific robot cell, and the program codes of at least some of the programming blocks are interactive and configured to adjust said sequence of views in dependence on user input in response to the displayed questions.

4. The system according to claim 1, wherein said parameters include waypoints on movement paths for the robot.

5. The system according to claim 1, wherein the first graphical user interface allows a user to define an entry point for each of the workstations and to specify first movement paths for the robot between the defined entry points, the second graphical user interface allows a user to specify second movement paths for the robot from the entry points for carrying out the tasks at the selected workstations, and the robot program generator is configured to generate the robot program based on the specified first and second movement paths.

6. The system according to claim 1, wherein the second graphical user interface allows the user to specify the order in which the robot is going to visit the workstations, and the robot program generator is configured to generate the robot program based on the specified order for visiting the workstations.

7. The system according to claim 1, wherein said program code for generating a graphical user interface comprises accommodations for optional text to be presented to the user, and the first graphical interface is configured to allow a user to input text with instructions and questions to the user, and said programming tool generator is configured to fill in the text received from the user in said accommodations.

8. The system according to claim 2, the system further comprising a first computing unit including a first display device, user input means, and said programming tool generator, and said graphical generator is configured to display the first graphical user interface on the first display device, and a second computing unit configured to receive the generated guiding tool, and comprising a memory location for storing the guiding tool, a second display device, user input means, said program executer configured to execute the guiding tool to display the second graphical user interface on the second display device, and said robot program generator.

9. A computer based method for programming an industrial robot to perform work in a robot cell including a plurality of workstations, the method comprising:

providing a plurality of programming blocks, each of the programming blocks including robot code comprising program instructions for the robot to carry out a part of a task, and at least some of the programming blocks include program code comprising program instructions for generating a graphical user interface for guiding a user to program the part of the task, generating a first wizard including a first graphical user interface allowing a user to define a plurality of workstations and to select a sequence of said programming blocks for each of the defined workstations, and to define at least one specific robot cell including one or more of said defined workstations, receiving user inputs regarding selected sequences of said programming blocks for the defined workstations, storing the defined workstations of the specific robot cell, and generating a guiding took for programming said at least one specific robot cell based on the defined workstations of the specific robot cell, and the program code in the selected sequences of programming blocks for the defined workstations, wherein the guiding tool includes program code for generating a second wizard comprising a graphical user interface including a sequence of views including instructions for guiding a user to program the specific robot cell.

10. The method according to claim 9, the method further comprising:

executing the guiding tool, displaying the second graphical user interface allowing the user to select one or more of the workstations in the specific robot cell, and to input parameters in response to the displayed instructions, receiving user inputs in response to the displayed instructions, and generating a robot program based on the robot code of the selected sequences of programming blocks for the selected workstations, and the received user inputs.

11. The method according to claim 9, wherein the method comprises generating a graphical user interface including instructions for guiding a user to program the work station for each of the defined workstations based on the program code in the selected programming blocks, and generating said guiding tool based on the generated graphical user interfaces for the defined workstations of the specific robot cell.

12. The method according to claim 9, wherein the first graphical user interface is generated on a first programming unit, the second user interface is generated on a second programming unit, the guiding tool is generated on the first programming unit and the robot program is generated on the second programming unit, and the method comprises transferring the guiding tool and the robot code of the selected sequences of programming blocks for the workstations of the specific robot cell from the first computing unit to the second programming unit.

13. The method according to claim 9, wherein the first graphical user interface allows a user to define an entry point for each of the workstations and to specify first movement paths for the robot between the defined entry points, the second graphical user interface allows a user to specify second movement paths for the robot from the entry points for carrying out the tasks at the selected workstations, and the method comprises receiving first movement paths from a first user, receiving second movement paths from a second user, and generating the robot program based on the first and second movement paths.

14. The method according to claim 9, wherein said sequence of views includes questions regarding the workstations in the specific robot cell, and the method comprises displaying the views with the questions, receiving response to the displayed questions, and adjusting the second user interface in dependence on the response to the displayed questions.

15. A computer program directly loadable into the internal memory of the computer or a processor, comprising software code portions for performing the steps of a computer based method for programming an industrial robot to perform work in a robot cell including a plurality of workstations when said program is running on one or more computers, the method comprising, providing a plurality of programming blocks, each of the programming blocks including robot code comprising program instructions for the robot to carry out a part of a task, and at least some of the programming blocks include program code comprising program instructions for generating a graphical user interface for guiding a user to program the part of the task, generating a first wizard including a first graphical user interface allowing a user to define a plurality of workstations and to select a sequence of said programming blocks for each of the defined workstations, and to define at least one specific robot cell including one or more of said defined workstations, receiving user inputs regarding selected sequences of said programming blocks for the defined workstations, storing the defined workstations of the specific robot cell, and generating a guiding tool for programming said at least one specific robot cell based on the defined workstations of the specific robot cell, and the program code in the selected sequences of programming blocks for the defined workstations, wherein the guiding tool includes program code for generating a second wizard comprising a graphical user interface including a sequence of views including instructions for guiding a user to program the specific robot cell.

16. A non-transitory computer readable medium having a program recorded thereon, when the program is to make one or more computers perform the steps of a computer based method for programming an industrial robot to perform work in a robot cell including a plurality of workstations, said program is running on the computer, and the method comprising:

providing a plurality of programming blocks, each of the programming blocks including robot code comprising program instructions for the robot to carry out a part of a task, and at least some of the programming blocks include program code comprising program instructions for generating a graphical user interface for guiding a user to program the part of tire task, generating a first wizard including a first graphical user interface allowing a user to define a plurality of workstations and to select a sequence of said programming blocks for each of the defined workstations, and to define at least one specific robot cell including one or more of said defined workstations, receiving user inputs regarding selected sequences of said programming blocks for the defined workstations, storing the defined workstations of the specific robot cell, and generating a guiding tool for programming said at least one specific robot cell based on the defined workstations of the specific robot cell, and the program code in the selected sequences of programming blocks for the defined workstations, wherein the guiding tool includes program code for generating a second wizard comprising a graphical user interface including a sequence of views including instructions for guiding a user to program the specific robot cell.

* * * * *